United States Patent
Rejman

(10) Patent No.: US 8,967,202 B2
(45) Date of Patent: Mar. 3, 2015

(54) PLUG DEVICE FOR GAS TURBINE ENGINE SHAFT

(75) Inventor: Marcin Rejman, Rzeszow (PL)

(73) Assignee: Pratt & Whitney Canada Corp., Longueuil (CA)

( * ) Notice: Subject to any disclaimer, the term of this patent is extended or adjusted under 35 U.S.C. 154(b) by 749 days.

(21) Appl. No.: 13/239,887

(22) Filed: Sep. 22, 2011

(65) Prior Publication Data

US 2013/0071229 A1  Mar. 21, 2013

(30) Foreign Application Priority Data

Sep. 21, 2011  (EP) .................................... 11461538

(51) Int. Cl.
- *F16L 55/10* (2006.01)
- *F01D 25/18* (2006.01)
- *F16L 55/136* (2006.01)

(52) U.S. Cl.
CPC ............. *F01D 25/183* (2013.01); *F16L 55/136* (2013.01); *F05D 2240/61* (2013.01)
USPC ............................... 138/89; 138/90; 411/60.1

(58) Field of Classification Search
CPC ..... F16L 55/136; F16L 55/132; F16B 13/065
USPC ............ 138/89, 90; 411/60.1; 415/110, 168.4
See application file for complete search history.

(56) References Cited

U.S. PATENT DOCUMENTS

| | | | |
|---|---|---|---|
| 1,463,824 A * | 8/1923 | Leuvelink | 220/236 |
| 2,062,519 A * | 12/1936 | Ljungberg | 138/90 |
| 2,855,003 A * | 10/1958 | Thaxton | 138/90 |
| 3,291,156 A | 12/1966 | Corsano | |
| 3,323,551 A | 6/1967 | Bell et al. | |
| 3,667,640 A | 6/1972 | Morrow | |
| 4,262,702 A | 4/1981 | Streich | |
| 4,424,004 A | 1/1984 | Hiskes | |
| 4,493,344 A | 1/1985 | Mathison et al. | |
| 4,585,033 A | 4/1986 | Westman | |
| 4,600,036 A | 7/1986 | Noe | |
| 4,678,383 A * | 7/1987 | Bergner | 411/32 |
| 4,723,578 A * | 2/1988 | Mordarski et al. | 138/97 |
| 4,854,793 A * | 8/1989 | Ollivier et al. | 411/49 |

(Continued)

FOREIGN PATENT DOCUMENTS

WO  2010085154 A1  7/2010

OTHER PUBLICATIONS

Extended European Search Report dated Feb. 10, 2012 of corresponding European application No. 11461538.8.

*Primary Examiner* — Patrick F Brinson
(74) *Attorney, Agent, or Firm* — Norton Rose Fulbright Canada LLP

(57) ABSTRACT

A device for plugging an axially-aligned bore in a shaft of a gas turbine engine comprises a plug. A sealing body of the plug is sealingly received in a bore of the shaft. Legs project from the sealing body and are displaceable between a normally contracted position in which the legs are radially inward relative to a periphery of the bore, and a deployed position in which the legs project radially outward and engage with shaft projections within the bore of the shaft. A wedge is operatively engaged to the plug for movement of the wedge relative to the plug. The wedge comprises a portion in operative contact with the legs of the plug unit to displace the legs between positions as a response to movement of the wedge. A gas turbine engine and a method for plugging a shaft are provided.

29 Claims, 4 Drawing Sheets

(56) References Cited

U.S. PATENT DOCUMENTS

| | | | |
|---|---|---|---|
| 5,437,309 A | | 8/1995 | Timmons |
| 5,521,951 A | * | 5/1996 | Charnley et al. ............... 376/260 |
| 5,797,431 A | | 8/1998 | Adams |
| 5,819,804 A | | 10/1998 | Ferrer et al. |
| 5,918,638 A | | 7/1999 | Davis |
| 5,944,057 A | | 8/1999 | Pierce |
| 6,003,557 A | * | 12/1999 | Brelig et al. .................... 138/89 |
| 6,155,575 A | | 12/2000 | Hawkins et al. |
| 6,170,530 B1 | | 1/2001 | Steblina |
| 6,257,266 B1 | | 7/2001 | Valdez |
| 6,270,440 B1 | | 8/2001 | Adeyemi et al. |
| 6,428,017 B1 | | 8/2002 | Galonska et al. |
| 7,640,949 B2 | | 1/2010 | Hawkins |
| 7,857,360 B2 | * | 12/2010 | Lambert et al. ............... 285/322 |
| 7,946,593 B2 | | 5/2011 | Alam et al. |
| 8,162,577 B2 | * | 4/2012 | Moore ......................... 411/60.1 |
| 2011/0180171 A1 | | 7/2011 | Gallet et al. |

\* cited by examiner

PLUG DEVICE FOR GAS TURBINE ENGINE SHAFT

FIELD OF THE INVENTION

The present application pertains to plug devices to plug shafts in gas turbine engines.

DESCRIPTION OF THE PRIOR ART

In some instances, it may be required to plug gas turbine engine shafts to keep the oil within the shaft. For instance, a first shaft may require a plug when a mating second shaft is not connected to the shaft. However, the plug is exposed to oil and oil pressures and temperatures. The design of a plug must take such factors into consideration.

SUMMARY

Therefore, in accordance with a general aspect, there is provided a device for plugging an axially-aligned bore in a shaft of a gas turbine engine, comprising: a plug comprising a sealing body shaped to be sealingly received in a bore of the shaft, and legs projecting from the sealing body and being displaceable between a normally contracted position in which the legs are radially inward relative to a periphery of the bore, and a deployed position in which the legs project radially outward and are adapted to engage with shaft projections within the bore of the shaft; and a wedge operatively engaged to the plug for movement of the wedge relative to the plug, the wedge comprising a portion in operative contact with the legs of the plug unit to displace the legs between said positions as a response to said movement of the wedge.

Further in accordance with the present disclosure, there is provided A gas turbine engine comprising: a shaft defining an axially-aligned bore with projections within the bore; and a device for plugging the shaft comprising: a plug comprising a sealing body sealingly received in the bore of the shaft, and legs projecting from the sealing body and being displaceable between a normally contracted position in which the legs are radially inward relative to a periphery of the bore, and a deployed position in which the legs project radially outward in engagement with said projections within the shaft; and a wedge operatively engaged to the plug for movement of the wedge relative to the plug, the wedge comprising a portion in operative contact with the legs of the plug to displace the legs between said positions as a response to said movement of the wedge.

Still further in accordance with the present disclosure, there is provided a method for plugging a shaft of a gas turbine engine with a plug device, comprising: sealingly engaging the plug device in the shaft by inserting the plug device in an axially-aligned bore of the shaft; and securing the plug device to the shaft by deploying legs of the plug device radially into contact with shaft projections within the bore.

DESCRIPTION OF THE PREFERRED EMBODIMENTS

Figure 1:
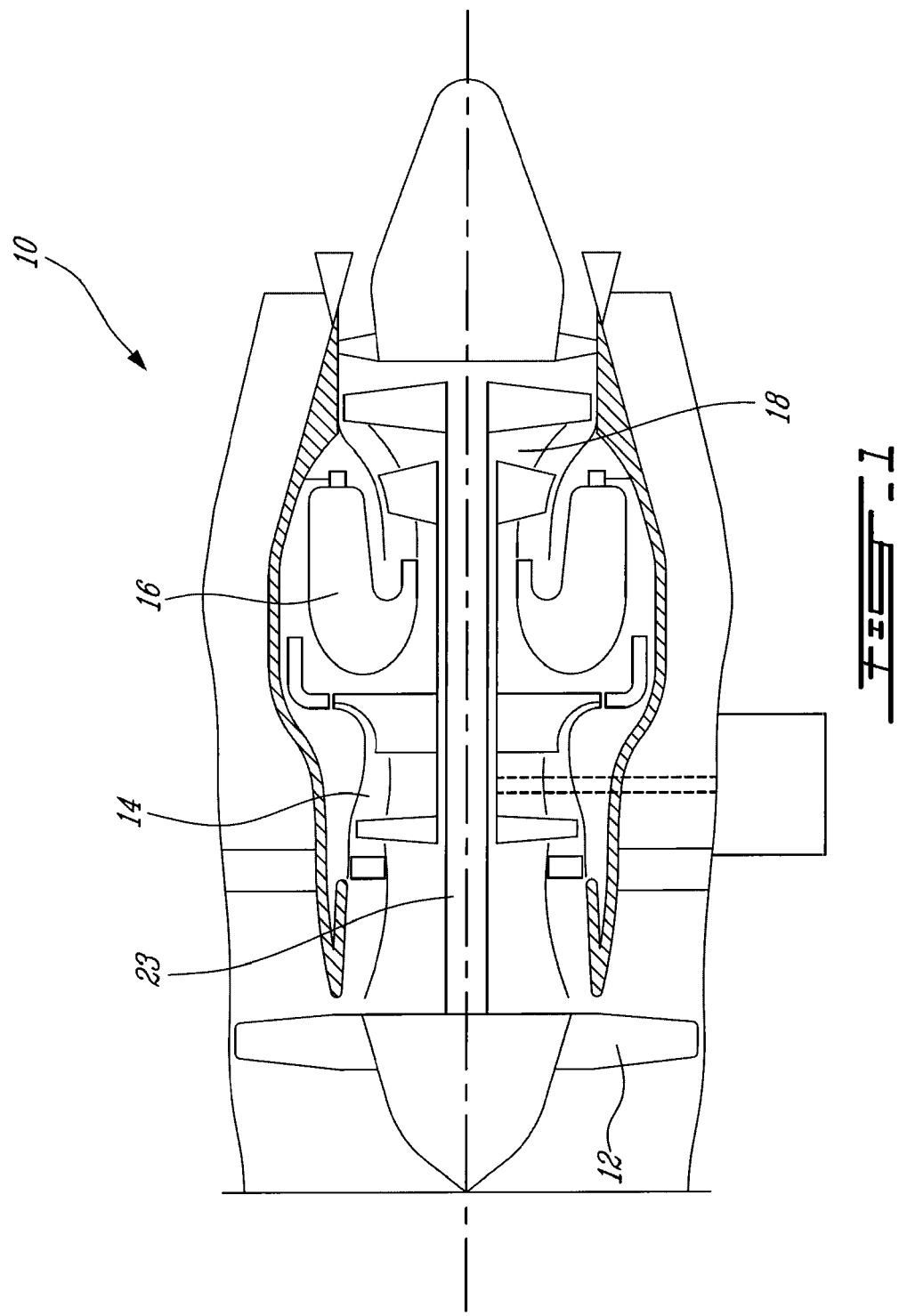
FIG. 1 is a schematic view of a gas turbine engine, illustrating a shaft of the type plugged by a plug device of the present disclosure.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
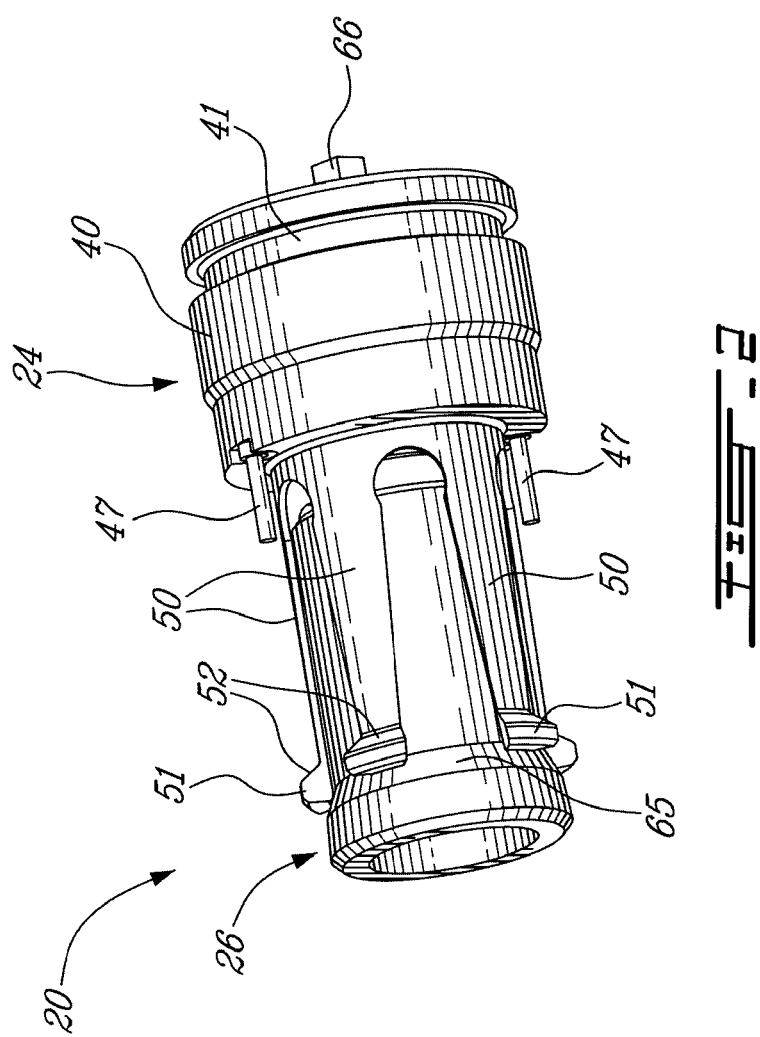
FIG. 2 is a perspective view of the plug device of the present disclosure in an assembled condition.
Figure 3:
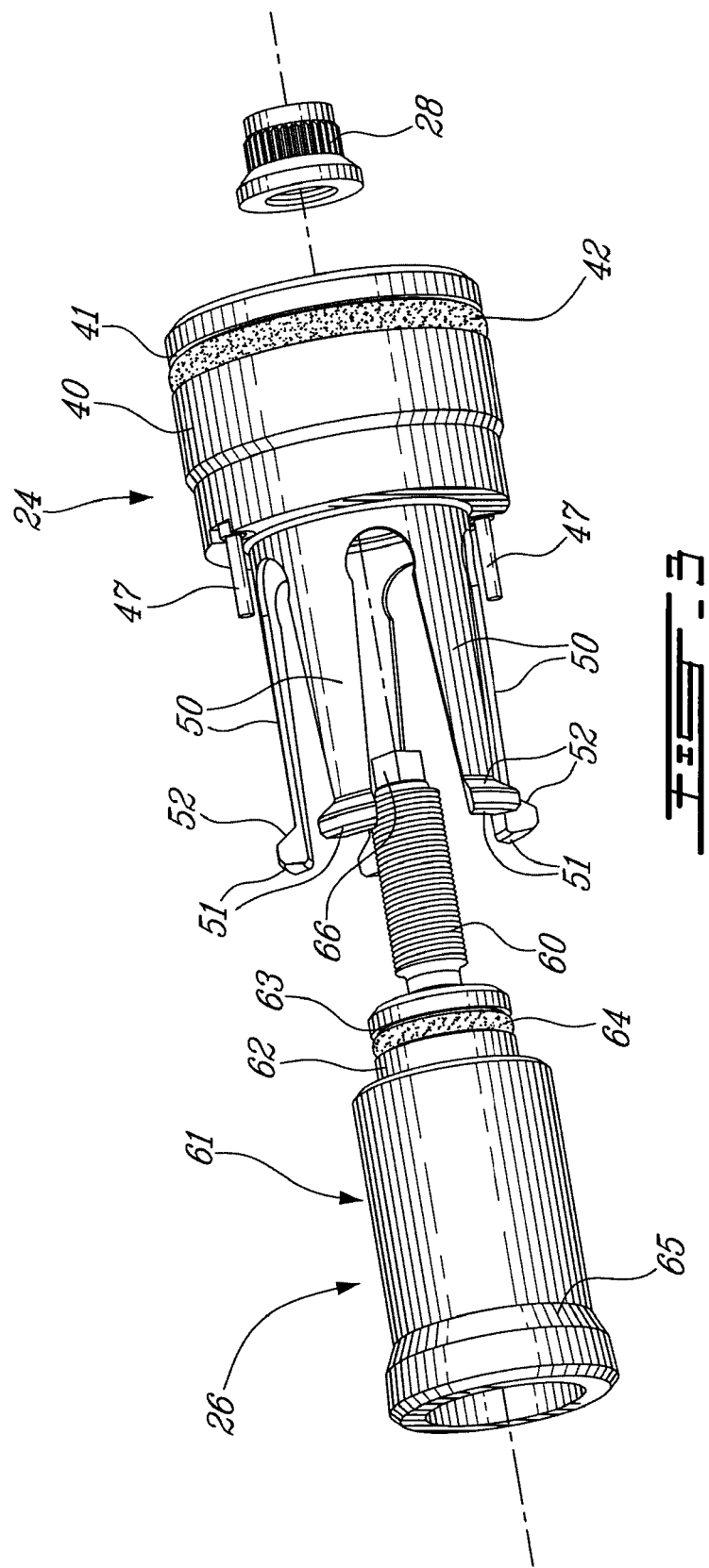
FIG. 3 is an exploded view of the plug device of FIG. 2.

Referring concurrently to FIGS. 2 and 3, a plug device in accordance with the present disclosure is generally shown at 20. The plug device 20 is used with a hollow shaft 23 (FIG. 1 and FIG. 4) that is located within the gas turbine engine 10. The plug device 20 has an annular plug unit 24 with a wedge unit 26 inserted into the annular plug unit 24. A nut 28 may secure the wedge unit 26 to the annular plug unit 24.

The annular plug unit 24 is the main component of the plug device 20 blinding the shaft 23, and is sealingly inserted in the shaft 23.

The wedge unit 26 expands the diameter of the annular plug unit 24 for the plug device 20 to be releasably connected to the shaft 23.

Figure 4:
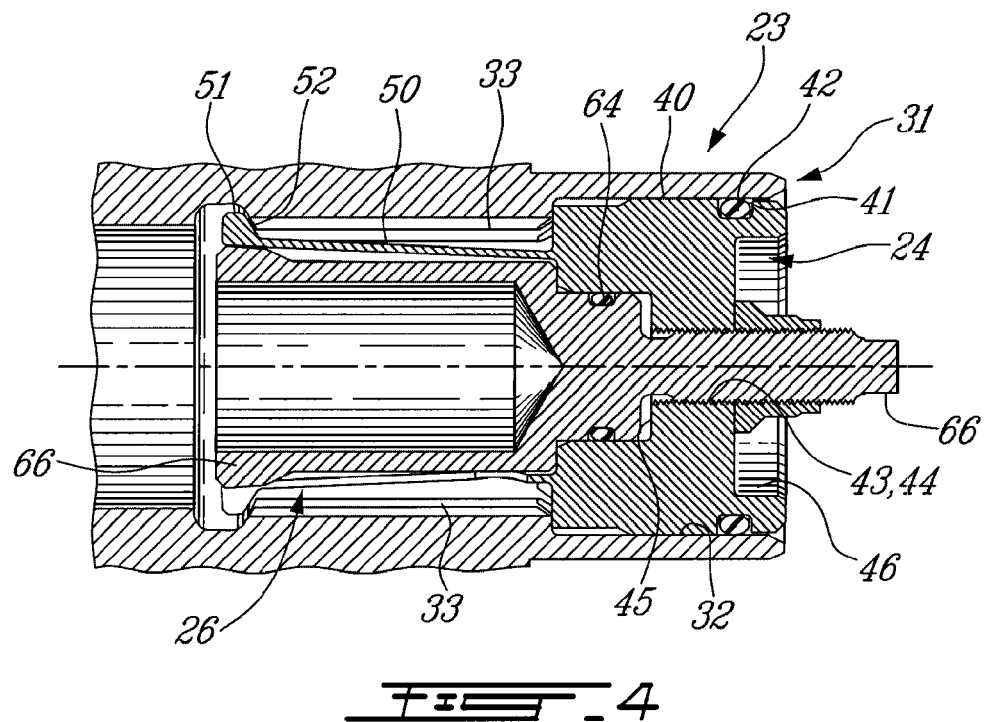
FIG. 4 is a sectional view of the plug device of FIG. 2, with legs in a deployed position in a shaft.

Referring to FIG. 4, the shaft 23 is of the type being hollow, with an inlet end 31. The inlet end 31 may form a female end for the shaft 23 to be connected to other components, such as another shaft. Accordingly, the shaft 23 has an axially-aligned bore 32 with inner projections, such as splines 33. The shaft 23 may feature other types of projections, such as inner flanges, shoulders of channels, etc.

Referring concurrently to FIGS. 2 to 5, the annular plug unit 24 has an annular body 40, also referred to as a sealing body. An annular channel 41 is defined in an outer surface of the annular body 40 and is devised to receive one or more annular seals 42. The annular seal 42 is any appropriate type of seal suited to be in contact with the fluid which must be kept within the shaft 23, such as oil. For instance, the annular seal 42 is an O-ring, wiper seal, etc.

A throughbore 43 is defined in the annular body 40. The throughbore 43 may be tapped as shown by tapping 44. The annular body 40 may further have counterbores 45 and 46 on opposite sides of the throughbore 43. Locating pins 47 project axially from the annular body 40 and are oriented towards the wedge unit 26. Other arrangements are possible for the annular body 40. For instance the annular body 40 may be without the counterbores 45 and/or 46. Moreover, the throughbore 43 may not have any tapping 44, and may not be concentric relative to the annular body 40. The annular body 40 is made of any appropriate material to sustain the pressures and temperatures of a gas turbine engine. For instance, the annular body 40 may be machined from a metallic material. The body 40 may have other configurations as alternatives to being annular, as long as the body 40 is sized to plug the shaft 23 with its outer surface.

Still referring to FIGS. 2 to 5, legs 50 project axially from one end of the annular body 40. The legs 50 may be integral with the annular body. The annular plug unit 24 is shown having five legs 50 radially spaced apart along a radius of the annular body 40. The annular plug unit 24 may have more or less than the five legs 50 shown in FIG. 3. Feet 51 are part of the legs 50 and project radially outward at the free end of each of the legs 50. The feet 51 are projections by which the annular plug unit 24 will grasp projections within the shaft 23. Each of the feet 51 may feature a ramp 52 facing toward the annular body 40.

Figure 5:
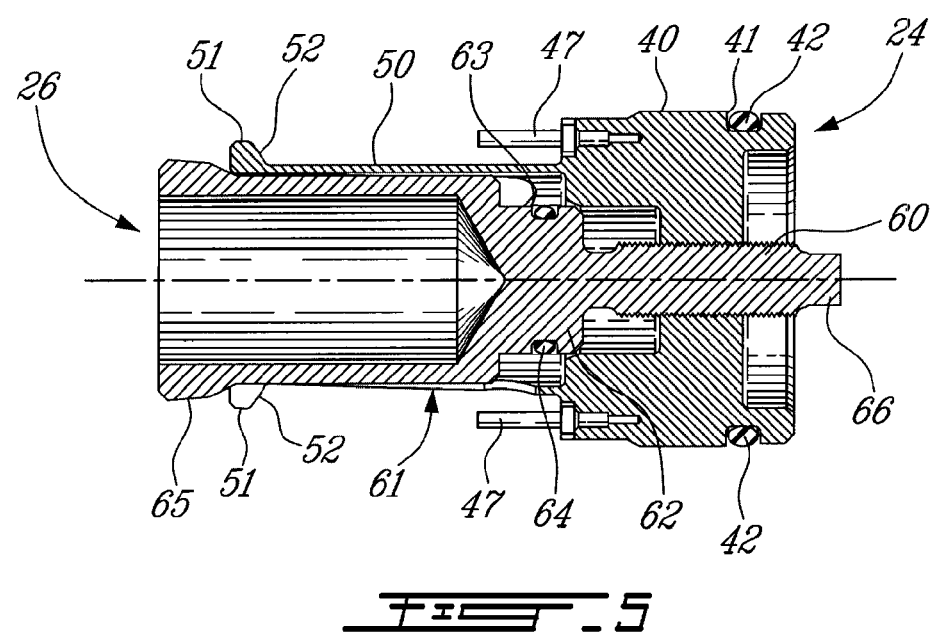
FIG. 5 is a sectional view of the plug device of FIG. 2 with the legs being in a contracted position.

Referring to FIGS. 3 to 5, the wedge unit 26 is shown having a stem 60. The stem 60 may be a threaded rod, as shown in the illustrated embodiment. A skirt 61 is at one end of the stem 60. The skirt 61 has a base 62. The base 62 has a periphery that matches that of the counterbore 45 of the annular body 40. An annular channel 63 is defined in a peripheral surface of the base 62 and accommodates a portion of one or more seals 64. Therefore, as shown in FIG. 4, when the wedge unit 26 is mated to the annular plug unit 24, the base 62 of the skirt 61 is matingly received in the counterbore 45, with the seal 64 closing the gap therebetween. The skirt 61 has a wedge portion 65 extending from the base 62.

According to another embodiment, the wedge unit 26 is made of a metallic material. The material of the wedge unit 26 must be chosen to sustain the pressures and temperatures related to gas turbine engine use. It is pointed out that the annular seal between the wedge unit 26 and the annular plug unit 24 may be located at other positions. Moreover, it is considered to size of the annular plug unit 24 and the wedge unit 26 such that the seal 64 is not required.

The wedge unit 26 and the annular plug unit 24 are sized such that the legs 50 of the annular plug unit 24 do not contact the wedge 65 at the end of the skirt 61 in a contracted configuration of the plug device 20 shown in FIG. 5. In the contracted configuration, the stem 60 of the wedge unit 26 is engaged into the throughbore 43. Therefore, a rotation of the wedge unit 26 along its longitudinal axis will cause it to move along the longitudinal axis of the plug device 20 and thus of the shaft 23, by the screwing engagement between the stem 60 and the tapped bore 43. For this reason, the stem 60 has a tooling end 66 (i.e., flat engagement surfaces) by which an appropriate tool may be used to rotate the wedge unit 26. It is pointed that other types of joints may be formed between the wedge unit 26 and the plug unit 24. According to an embodiment, any appropriate one-degree-of-freedom translational joint may be used, such as a sliding joint, a cylindrical joint, etc, as alternatives to the screw joint.

The plug device 20 in the contracted configuration of FIG. 5 is sized to be inserted in the bore 32 of the shaft 23, with the legs 50 being in a contracted position. The bore 32 of the shaft 23 defines a throat by the presence of the splines 33 or like projections. However, the diameter of the plug device 20 is small enough for the feet 51 to move axially beyond the splines 33 in the shaft 23.

Once the feet 51 are beyond the splines 33, the wedge unit 26 is moved axially relative to the annular plug unit 24. In the illustrated embodiment, the wedge unit 26 is screwingly rotated. The annular plug unit 24 does not rotate because of the alignment pins 47 being engaged with the splines 33. As the wedge unit 26 moves axially along the shaft 23, the wedge portion 65 will contact the end of the legs 50, thereby pushing the feet 51 radially outwardly, to a deployed position of the legs. The feet 51 therefore come into contact with the splines 33, causing the plug device 20 to remain captive in the shaft 23. The nut 28 may then be used to block the wedge unit 26 and the annular plug unit 24 in the deployed configuration.

Accordingly, the plug device 20 being in the deployed configuration of FIG. 4 is held captive inside the shaft 23, and the nut 28 prevents any substantial movement between the annular plug unit 24 and the wedge unit 26. The seal 42 blocks the gap between the bore 32 of the shaft 23 and the outer surface of the annular body 40 of the plug unit 24. Similarly, the seal 64 blocks the gap between the base 62 of the wedge unit 26 and the peripheral surface of the counter bore 45 of the annular plug unit 24.

In order to remove the plug device 20, the nut 28 is removed if there is such a nut 28. Then, the wedge unit 26 is rotated in the opposite direction so as to bring the plug device 20 to the contracted configuration of FIG. 5. Once the contracted configuration of FIG. 5 is reached, the plug device 20 may be pulled out of the annular shaft 23.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

What is claimed is:

1. A device for plugging an axially-aligned bore in a shaft of a gas turbine engine, comprising:
    a plug comprising a sealing body shaped to be sealingly received in a bore of the shaft, and legs projecting from the sealing body and being displaceable between a normally contracted position in which the legs are radially inward relative to a periphery of the bore, and a deployed position in which the legs project radially outward and are adapted to engage with shaft projections within the bore of the shaft;
    a wedge operatively engaged to the plug for movement of the wedge relative to the plug, the wedge comprising a portion in operative contact with the legs of the plug unit to displace the legs between said positions as a response to said movement of the wedge; and
    wherein the sealing body is an annular body, and the wedge is matingly engaged in the annular body, at least one seal being between the wedge and the annular body.

2. The device according to claim 1, wherein the wedge forms a one-degree-of-freedom translational joint with the plug, with the movement being axially along the plug.

3. The device according to claim 2, wherein the translational joint comprises a threaded rod projecting axially from the wedge portion, the threaded rod of the wedge screwingly engaged into a tapped bore of the plug.

4. The device according to claim 3, further comprising flat engagement surfaces at a free end of the threaded rod.

5. The device according to claim 1, wherein the sealing body comprises an annular channel in its outer surface, and at least one seal partly received in the annular channel.

6. The device according to claim 1, wherein the legs each comprise a radially-projecting foot at a free end adapted to engage with the shaft projections within the bore of the shaft.

7. The device according to claim 6, wherein each said foot comprises a ramp surface facing toward the sealing body.

8. The device according to claim 1, further comprising at least one alignment projection extending from the sealing body and adapted to axially engage with the shaft projections.

9. The device according to claim 3, further comprising a nut screwingly engaged to the threaded rod and fixing the wedge to the plug in the deployed position.

10. A gas turbine engine comprising:
    a shaft defining an axially-aligned bore with projections within the bore; and
    a device for plugging the shaft comprising:
        a plug comprising a sealing body sealingly received in the bore of the shaft, at least one alignment projection extending from the sealing body and legs projecting from the sealing body and being displaceable between a normally contracted position in which the legs are radially inward relative to a periphery of the bore, and a deployed position in which the legs project radially outward in engagement with said projections within the shaft; and a wedge operatively engaged to the plug for movement of the wedge relative to the plug, the wedge comprising a portion in operative contact with the legs of the plug to displace the legs between said positions as a response to said movement of the wedge wherein the projections within the bore of the shaft are splines, and further wherein the at least one alignment projection is adapted to axially engage are with the splines.

11. A method for plugging a shaft of a gas turbine engine with a plug device, comprising:

sealingly engaging the plug device in the shaft by inserting the plug device in an axially-aligned bore of the shaft and by axially aligning the plug device with the shaft by inserting at least one alignment projection of the plug device between splines of the shaft; and securing the plug device to the shaft by deploying legs of the plug device radially into contact with shaft projections within the bore.

12. The method according to claim 11, wherein securing the plug device comprising moving a wedge along a plug of the plug device to deploy the legs of the plug.

13. The method according to claim 12, wherein moving the wedge comprising screwingly rotating the wedge to axially displace the wedge along the plug.

14. The method according to claim 13, further comprising screwing a nut onto the wedge to block the plug device with the legs deployed laterally.

15. The method according to claim 11, further comprising releasing the plug device from securement to the shaft by contracting the legs.

16. The method according to claim 15, further comprising pulling the plug device out of the shaft when the legs are contracted.

17. A device for plugging an axially-aligned bore in a shaft of a gas turbine engine, comprising:

a plug comprising a sealing body shaped to be sealingly received in a bore of the shaft, and legs projecting from the sealing body and being displaceable between a normally contracted position in which the legs are radially inward relative to a periphery of the bore, and a deployed position in which the legs project radially outward and are adapted to engage with shaft projections within the bore of the shaft, a radially-projecting foot at a free end of each said legs adapted to engage with the shaft projections within the bore of the shaft, each said foot comprising a ramp surface facing toward the sealing body; and a wedge operatively engaged to the plug for movement of the wedge relative to the plug, the wedge comprising a portion in operative contact with the legs of the plug unit to displace the legs between said positions as a response to said movement of the wedge.

18. The device according to claim 17, wherein the wedge forms a one-degree-of-freedom translational joint with the plug, with the movement being axially along the plug.

19. The device according to claim 18, wherein the translational joint comprises a threaded rod projecting axially from the wedge portion, the threaded rod of the wedge screwingly engaged into a tapped bore of the plug.

20. The device according to claim 19, further comprising flat engagement surfaces at a free end of the threaded rod.

21. The device according to claim 17, wherein the sealing body comprises an annular channel in its outer surface, and at least one seal partly received in the annular channel.

22. The device according to claim 1, further comprising at least one alignment projection extending from the sealing body and adapted to axially engage with the shaft projections.

23. The device according to claim 19, further comprising a nut screwingly engaged to the threaded rod and fixing the wedge to the plug in the deployed position.

24. A device for plugging an axially-aligned bore in a shaft of a gas turbine engine, comprising:

a plug comprising a sealing body shaped to be sealingly received in a bore of the shaft, and legs projecting from the sealing body and being displaceable between a normally contracted position in which the legs are radially inward relative to a periphery of the bore, and a deployed position in which the legs project radially outward and are adapted to engage with shaft projections within the bore of the shaft, at least one alignment projection extending from the sealing body and adapted to axially engage with the shaft projections; and a wedge operatively engaged to the plug for movement of the wedge relative to the plug, the wedge comprising a portion in operative contact with the legs of the plug unit to displace the legs between said positions as a response to said movement of the wedge.

25. The device according to claim 24, wherein the wedge forms a one-degree-of-freedom translational joint with the plug, with the movement being axially along the plug.

26. The device according to claim 25, wherein the translational joint comprises a threaded rod projecting axially from the wedge portion, the threaded rod of the wedge screwingly engaged into a tapped bore of the plug.

27. The device according to claim 26, further comprising flat engagement surfaces at a free end of the threaded rod.

28. The device according to claim 24, wherein the sealing body comprises an annular channel in its outer surface, and at least one seal partly received in the annular channel.

29. The device according to claim 26, further comprising a nut screwingly engaged to the threaded rod and fixing the wedge to the plug in the deployed position.

* * * * *